United States Patent
Dailey et al.

(10) Patent No.: US 9,574,497 B2
(45) Date of Patent: Feb. 21, 2017

(54) ENGINE MOUNTED INLET PLENUM FOR A ROTORCRAFT

(71) Applicant: Bell Helicopter Textron Inc., Fort Worth, TX (US)

(72) Inventors: Zachary Dailey, Keller, TX (US); Thomas Mast, Carrollton, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 442 days.

(21) Appl. No.: 14/048,973

(22) Filed: Oct. 8, 2013

(65) Prior Publication Data

US 2015/0096627 A1    Apr. 9, 2015

(51) Int. Cl.
*F02C 7/04*    (2006.01)
*B64D 33/02*    (2006.01)

(52) U.S. Cl.
CPC ............. *F02C 7/04* (2013.01); *B64D 33/02* (2013.01); *B64D 2033/0246* (2013.01); *Y10T 137/0536* (2015.04)

(58) Field of Classification Search
CPC .... B64D 33/02; B64D 2033/0286; F02C 7/04; F02C 7/055; F02C 7/042; F02C 7/05; F02C 7/052
USPC ............ 244/53 B; 60/39.092; 137/15.1, 15.2
See application file for complete search history.

(56) References Cited

U.S. PATENT DOCUMENTS

| | | | |
|---|---|---|---|
| 3,421,296 A * | 1/1969 | Beurer, Sr. ............ | B64D 33/02 209/710 |
| 5,662,292 A | 9/1997 | Greene et al. | |
| 6,595,742 B2 * | 7/2003 | Scimone ............... | B64D 33/02 244/53 B |
| 7,192,462 B2 | 3/2007 | Stelzer et al. | |
| 7,575,014 B2 * | 8/2009 | Stelzer .................. | B64D 33/02 137/15.1 |
| 8,096,499 B2 * | 1/2012 | Osswald ................ | F02C 7/052 244/17.11 |
| 8,163,050 B2 * | 4/2012 | Belyew ............. | B01D 46/0002 244/53 B |

(Continued)

FOREIGN PATENT DOCUMENTS

| | | | | |
|---|---|---|---|---|
| GB | 1192503 A | * | 5/1970 | ............ B64D 33/02 |
| GB | 1201096 A | * | 8/1970 | ............ B64D 33/02 |
| WO | 2012/148394 | | 11/2012 | |

OTHER PUBLICATIONS

Communication Pursuant to Article 94(3) EPC issued in European Application No. 14159944.9 on Aug. 4, 2014; 5 pages.

(Continued)

*Primary Examiner* — Benjamin P Lee

(57) ABSTRACT

One example of an engine mounted inlet plenum for a rotorcraft includes an inlet flange, an outlet flange and a plenum duct that connects the inlet flange and the outlet flange. The inlet flange, which defines an inlet to flow air into a barrier filtration system, is configured to be substantially aligned with a closed cowl door assembly of the rotorcraft. In some implementations, the plenum duct is configured to extend to an outer mold line (OML) of the rotorcraft such that the inlet flange is aligned with the OML. The outlet flange defines an outlet to flow air filtered by the barrier filtration system into an engine of the rotorcraft. The plenum duct allows air to flow from the inlet to the outlet.

19 Claims, 5 Drawing Sheets

(56) References Cited

U.S. PATENT DOCUMENTS

| | | | | |
|---|---|---|---|---|
| 8,439,295 | B2* | 5/2013 | Belyew | B01D 46/10 244/53 B |
| 8,512,450 | B2* | 8/2013 | Kazlauskas | B64D 33/02 244/53 B |
| 8,961,634 | B2* | 2/2015 | Boyce | B01D 46/103 415/121.2 |
| 2002/0134891 | A1 | 9/2002 | Guillot et al. | |
| 2002/0182062 | A1* | 12/2002 | Scimone | B64D 33/02 415/121.2 |
| 2007/0025838 | A1* | 2/2007 | Stelzer | B64D 33/02 415/121.2 |
| 2007/0151214 | A1* | 7/2007 | Stelzer | B01D 46/0005 55/306 |
| 2008/0173768 | A1* | 7/2008 | Chaniot | B64C 27/14 244/53 B |
| 2009/0007528 | A1 | 1/2009 | Wilson | |
| 2009/0261208 | A1* | 10/2009 | Belyew | B01D 46/10 244/53 B |
| 2010/0101206 | A1 | 4/2010 | Haehner et al. | |
| 2010/0230530 | A1* | 9/2010 | Nannoni | B64D 33/08 244/17.11 |
| 2011/0265650 | A1* | 11/2011 | Kazlauskas | B64D 33/02 95/269 |
| 2013/0087663 | A1* | 4/2013 | Dailey | B64D 33/02 244/53 B |
| 2014/0260127 | A1* | 9/2014 | Boyce | B64D 33/02 55/306 |
| 2015/0090844 | A1* | 4/2015 | Braeutigam | B64D 27/02 244/53 B |
| 2015/0291288 | A1* | 10/2015 | Bofill | B64D 33/02 244/53 B |

OTHER PUBLICATIONS

European Search Report issued in EP Application No. 14159944.9 on Jul. 2, 2014, 3 pages.
Communication Pursuant to Article 94(3) EPC issued in European Application No. 14159944.9 on Jan. 29, 2015; 5 pages.
Communication Pursuant to Article 94(3) EPC issued in European Application No. 14159944.9 on Sep. 2, 2015; 5 pages.

* cited by examiner

ENGINE MOUNTED INLET PLENUM FOR A ROTORCRAFT

TECHNICAL FIELD

This disclosure relates to an inlet plenum system for a rotorcraft.

BACKGROUND

Some rotorcrafts include cowling assemblies configured to act as a protective fairing around the engine and other propulsion related components. Certain rotorcraft configurations can include an engine housed in a nacelle which acts as an aerodynamic pod for the engine. The nacelle configuration can be implemented when the engine is located at a distance from the fuselage, such as on a wing of the rotorcraft. Inlet systems can be used to provide an aerodynamic flow path from the exterior of the cowl door assembly (or nacelle) to the engine inlet. In some configurations, filtration systems can be installed in the inlet systems.

SUMMARY

This disclosure relates to an engine mounted inlet plenum for a rotorcraft.

One innovative aspect of the subject matter described here can be implemented as a plenum assembly for a rotorcraft. The plenum assembly includes an inlet flange defining an inlet to flow air into a barrier filtration system. The inlet flange is configured to be substantially aligned with an outer surface of a closed cowl door assembly of the rotorcraft. The plenum assembly includes an outlet flange defining an outlet to flow air filtered by the barrier filtration system into an engine of the rotorcraft. The plenum assembly includes a plenum duct configured to connect the inlet flange and the outlet flange to flow air from the inlet to the outlet.

This, and other aspects, can include one or more of the following features. The plenum duct can be configured to extend to an outer mold line (OML) of the rotorcraft. The inlet flange can be configured to be aligned with the OML. The plenum inlet can be configured to form a gap between the inlet flange and the OML when the inlet flange is aligned with the OML and the cowl door assembly is closed. The plenum assembly can include a lip seal configured to at least partially cover the gap. The gap can be dimensioned based on a relative motion between the engine and the plenum duct. The OML can be included in the cowl door assembly. The plenum duct can be configured to be hard mounted to the engine of the rotorcraft. The plenum assembly can further include an inlet port formed in the plenum duct. The inlet port can be configured to receive a maintenance indicator operable to indicate a need for maintenance of the barrier filtration system.

Another innovative aspect of the subject matter described here can be implemented as an inlet system for a rotorcraft. The inlet system includes a plenum assembly and a cowl door assembly. The plenum assembly includes an inlet flange, an outlet flange, and a plenum duct. The inlet flange defines an inlet to flow air into a barrier filtration system, and is configured to be substantially aligned with an outer surface of a closed cowl door assembly of the rotorcraft. The outlet flange defines an outlet to flow air filtered by the barrier filtration system into an engine of the rotorcraft. The plenum duct is configured to connect the inlet flange and the outlet flange, and to flow air from the inlet to the outlet. The cowl door assembly includes a door member configured to be coupled to a structure of the rotorcraft, a cowl inlet opening and a cowl inlet duct.

This, and other aspects, can include one or more of the following features. The plenum assembly can be configured to be hard mounted to the engine of the rotorcraft. The inlet system can further include the barrier filtration system configured to filter air flowing into the engine through the plenum duct. The barrier filtration system can be configured to be positioned in the plenum assembly between the cowl door assembly and the engine. The barrier filtration system can be configured to be hard mounted to the plenum assembly. The plenum duct can be configured to extend to an outer mold line (OML) of the rotorcraft. The inlet flange can be configured to be aligned with the OML. The inlet flange can be configured to form a gap between the plenum inlet and the OML when the plenum inlet is aligned with the OML. The inlet system can include a lip seal configured to at least partially cover the gap. The inlet system can include an engine exhaust ejector configured to be connected to the plenum assembly to manage air flow around the gap. The gap can be dimensioned based on a relative motion between the engine and the plenum duct.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to an engine mounted inlet plenum for a rotorcraft. A rotorcraft engine is statically determinately or soft mounted to the rotorcraft frame using an engine plenum such that the engines move relative to the rest of the rotorcraft frame. Sometimes, an engine plenum can include an airframe piece and an engine piece. Barrier filtration systems are typically airframe mounted within the airframe mounted plenum. Elastomeric seal systems are used to interface between the engine and the rotorcraft structure, to separate the airflow through the inlet system from the engine bay, and to allow for relative motion. Such an arrangement can result in large relative motion between the engine and the airframe structure. In addition, the need to perform regular engine removals can render the configuration complicated and expensive. Moreover, elastomeric seals are prone to damage and can sometimes be ill-fitting resulting in user dissatisfaction, additional cost and excess weight.

The engine mounted inlet plenum described here can be hard-mounted to the engine. The barrier filtration system can be hard-mounted directly to the inlet plenum. There need be few or no other physical connections to the rotorcraft structure or to the cowl door assembly. The resulting system, i.e., the system that includes the engine, the plenum and the barrier filtration system, can include a gap to allow relative motion of the rotorcraft structure. In some implementations, an engine exhaust ejector can be used to create a negative pressure in the engine bay to effectively manage the air flow around the gap between the inlet plenum and the rotorcraft structure without the need for an elastomeric seal system. The inlet plenum described here can decrease (e.g., eliminate) tolerance issues, steps, gaps, seals or combinations of them. For example, the design can decrease sealing and tolerance issues that are encountered on the inlet plenum/ barrier filter installations. In addition, the plenum design can reduce complexity and decrease (e.g., eliminate) an interface between the engine inlet and the airframe. The design can also decrease (e.g., eliminate) misalignments and pre-load on the inlet system resulting in improved efficiency and reduced complexity. The design is such that when the cowl door assembly is opened, the inlet to the engine remains closed thereby substantially preventing foreign object damage to the engine.

Figure 1A:
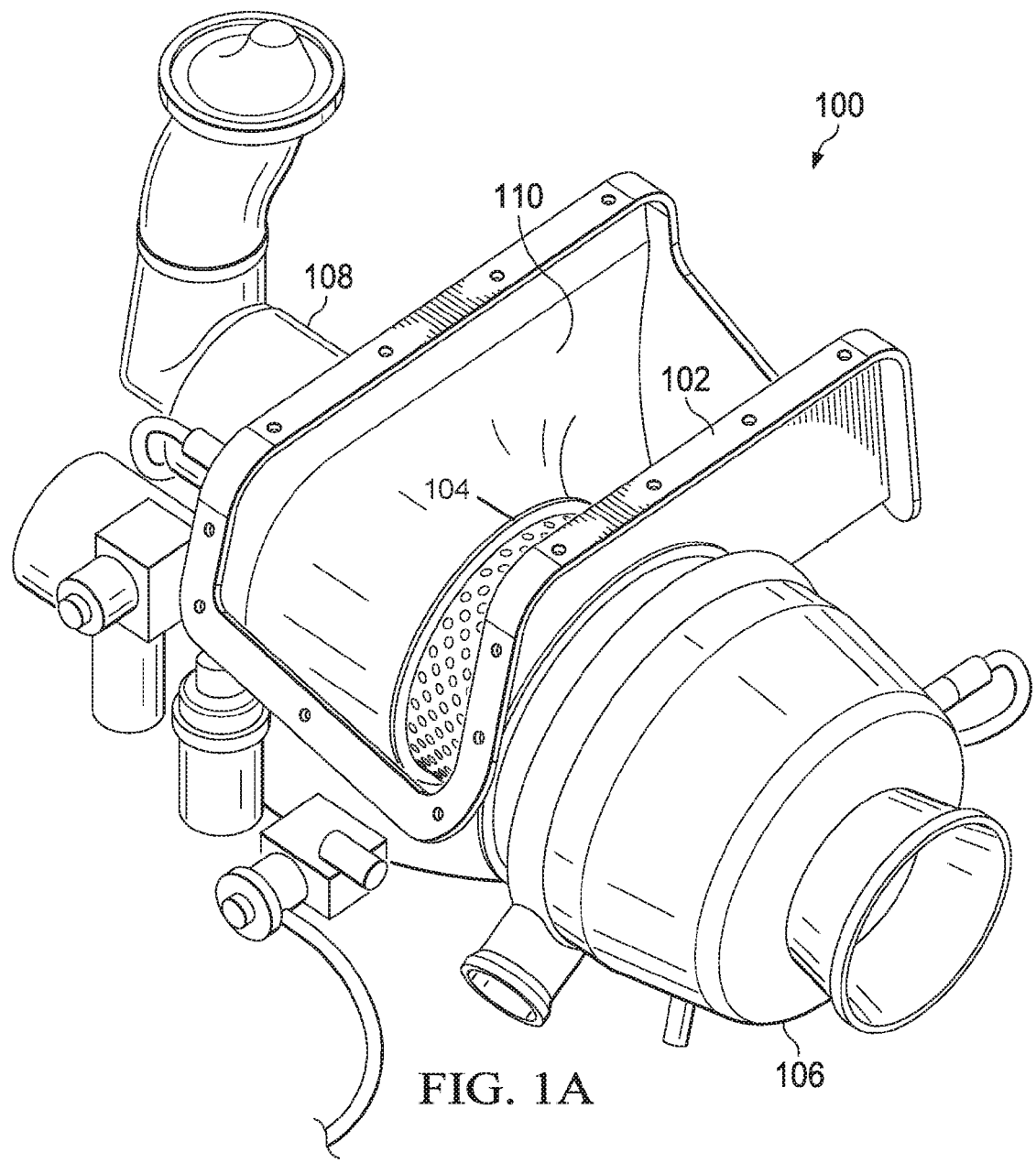
FIGS. 1A and 1B illustrate an example engine mounted plenum assembly for a rotorcraft.
Figure 1B:
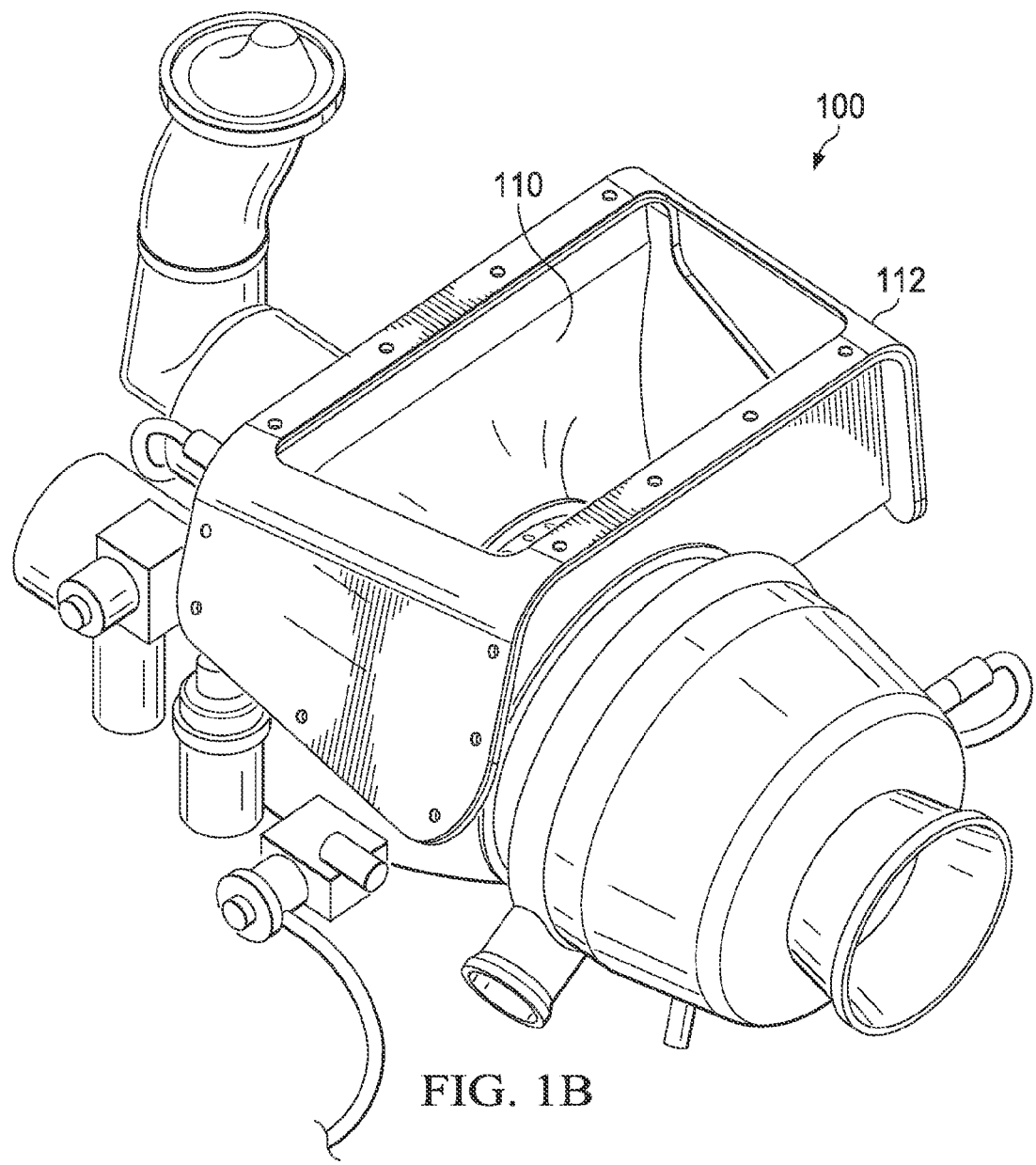

FIGS. 1A and 1B illustrate an example plenum assembly 100 for a rotorcraft. The plenum assembly 100 includes an inlet flange 102 that defines an inlet to flow air through the plenum assembly 100. The plenum assembly 100 includes an outlet flange defining an outlet to flow into an engine 106 of the rotorcraft. The plenum assembly 100 includes a plenum duct 110 configured to connect the inlet flange 102 and the outlet flange 104, and to flow air from the inlet to the outlet. In some implementations, the plenum duct 110 is configured to be hard mounted to an inlet 108 of the engine 106. Also, the plenum duct 110 is configured to extend to an outer mold line (OML) 112 such that the inlet flange 102 is aligned with the OML 112. For example, the OML 112 can be substantially aligned with an outer surface of a cowl door assembly of the aircraft such that the inlet flange 102 is substantially aligned with the outer surface.

In some implementations, the plenum assembly 100 and the cowl door assembly can be arranged to form a gap between the inlet flange 102 and the OML 112. The gap can be dimensioned based on a relative motion of the statically indeterminately mounted engine 106 relative to the plenum assembly 100, e.g., the plenum duct 110. A lip seal (not shown) can be configured to at least partially cover the gap. The lip seal need not completely seal the gap; rather, the lip seal can serve to cover the gap and to facilitate controlling air flow through the gap.

Figure 2:
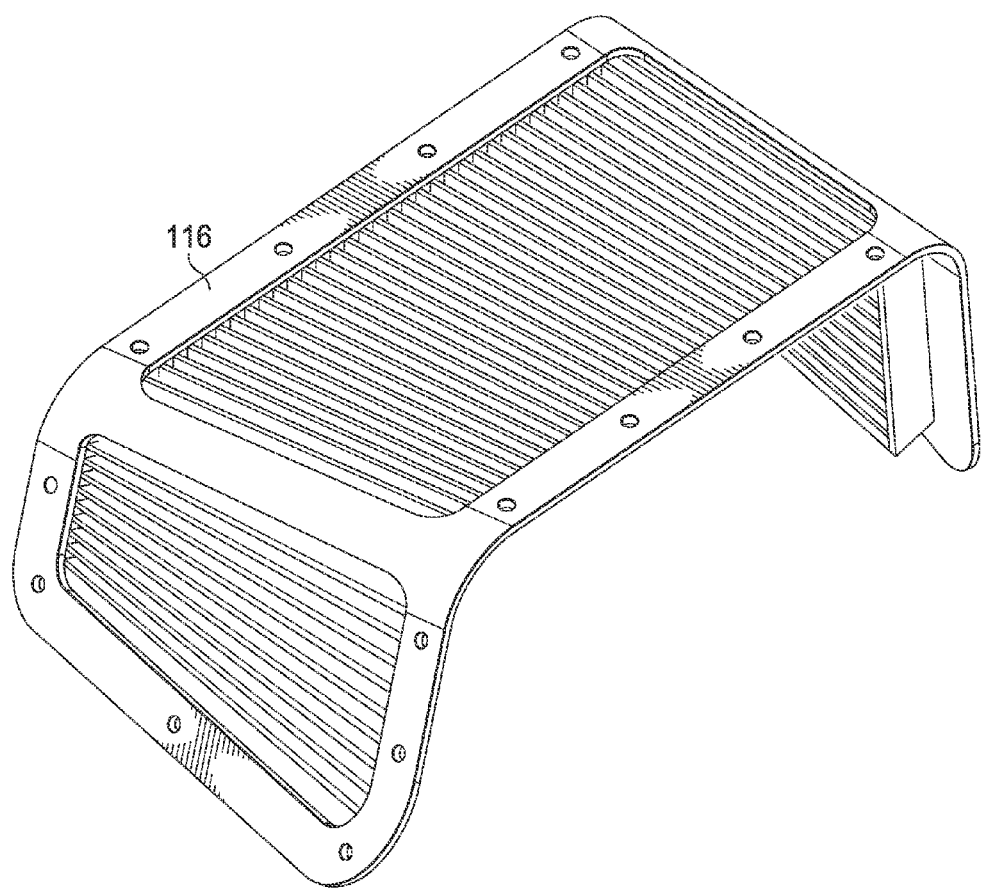
FIG. 2 illustrates an example barrier filtration system to be attached to the example plenum assembly of FIGS. 1A and 1B.

In some implementations, a barrier filtration system 116 (FIG. 2) can be positioned in the plenum assembly 100. For example, the barrier filtration system 116 can be positioned in the plenum duct 110 such that air that enters the inlet of the plenum assembly 100 through the inlet flange flows into the barrier filtration system 116. Also, air filtered by the barrier filtration system 116 can exit the plenum assembly 100 past the outlet flange 104 and into the inlet 108 of the engine 106. The barrier filtration system 116 can be any wetted media, e.g., an oil wetted media provided by Donaldson Filtration Solutions (Bloomington, Minn.). In some implementations, an inlet port (not shown) can be formed in the plenum duct 100. The inlet port can be configured to receive a maintenance indicator, which, in operation, can indicate a need for maintenance of the barrier filtration system 116.

Figure 3:
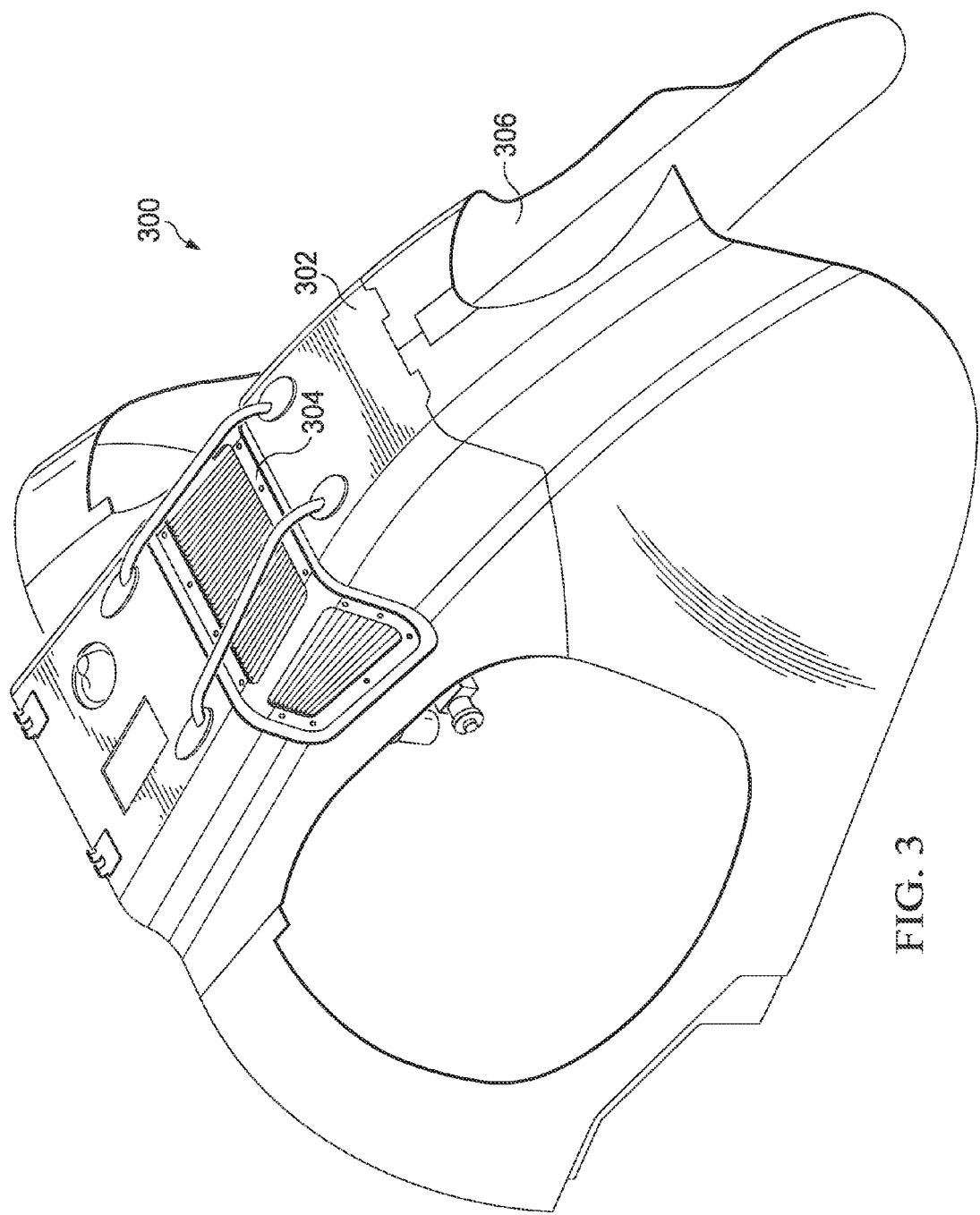
FIG. 3 illustrates an example inlet system for a rotorcraft.

FIG. 3 illustrates an example inlet system 300 for a rotorcraft. The inlet system 300 can include a plenum assembly such as the plenum assembly 100 described above. The inlet system 300 can also include a cowl door assembly 302, which can include a door member configured to be coupled to a structure 306 of the rotorcraft, a cowl inlet opening and a cowl inlet duct. The inlet system 300 can further include a barrier filtration system 304 (e.g., similar to the barrier filtration system 116) configured to filter air flowing into the engine through the plenum assembly. As shown in FIG. 3, a plenum duct of the plenum assembly can extend to an OML of the cowling door assembly 302 such that an inlet flange of the plenum assembly can be aligned with the OML.

Figure 4:
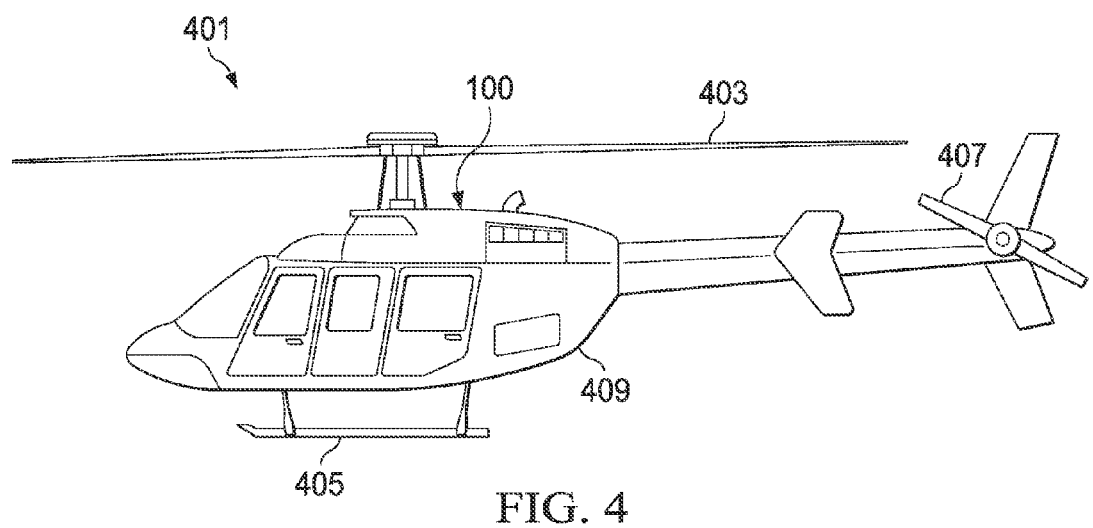
FIG. 4 illustrates the example inlet system in a rotorcraft.

FIG. 4 illustrates the inlet system in a rotorcraft 401. The rotorcraft 401 includes a rotor system 403 that is configured to provide lift, thrust, and directional control to the rotorcraft 401. A tail rotor 407 provides anti-torque control. The rotorcraft 401 further includes a fuselage 409 and landing gear 405. In some implementations, the rotorcraft 401 can include multiple engines, each having an inlet system 300. The orientation and position of each engine relative to the inlet system 300 can differ from that shown in FIG. 4. For example, the inlet system 300 can be oriented such that the door member extends on the left portion, right portion, or top portion of the cowl door assembly 302.

In some implementations, an aircraft can be a tilt rotor aircraft with nacelles that are configured to rotate so that the aircraft can fly in a helicopter mode and in an airplane mode. Each nacelle can include an engine with an inlet system 300, which, in some implementations, can be positioned on the outboard portion. Alternatively or in addition, the inlet system 300 can be positioned on other portions of the nacelle, e.g., a lower portion, an upper portion, an inboard portion or combinations of them. In some implementations, the aircraft can be a conventional aircraft having fixed nacelles which enable the aircraft to operate similar to a conventional fixed wing aircraft.

A number of implementations have been described. Nevertheless, it will be understood that various modifications may be made without departing from the spirit and scope of the disclosure.

The invention claimed is:

1. A plenum assembly for a rotorcraft, the plenum assembly comprising:
   a plenum duct having an inlet flange and an outlet flange at opposing ends of the plenum duct;
   the inlet flange defining an inlet to flow air into a barrier filtration system, the inlet flange configured to be substantially aligned with an outer surface of a closed cowl door assembly of the rotorcraft, wherein a gap between the inlet flange and the closed cowl door assembly allows relative motion of the plenum assembly and the rotorcraft;
   the outlet flange defining an outlet to flow air filtered by the barrier filtration system into an engine of the rotorcraft, wherein an inlet of the engine is connected to the cowl door assembly and the outlet flange is positioned between the inlet of the engine and the engine; and
   the plenum duct configured to flow air from the inlet to the outlet of the barrier filtration system and to be hard mounted to the engine of the rotorcraft.

2. The plenum assembly of claim 1, wherein the plenum duct is configured to extend to an outer mold line (OML) of the rotorcraft and wherein the inlet flange is configured to be aligned with the OML.

3. The plenum assembly of claim 2, wherein the plenum inlet is configured to form the gap between the inlet flange and the OML when the inlet flange is aligned with the OML and the cowl door assembly is closed.

4. The plenum assembly of claim 3, further comprising a lip seal configured to at least partially cover the gap between the inlet flange and the OML of the rotorcraft.

5. The plenum assembly of claim 3, wherein the gap is dimensioned based on a relative motion between the engine and the plenum duct.

6. The plenum assembly of claim 2, wherein the OML is included in the cowl door assembly.

7. The plenum assembly of claim 1, wherein when a door member of the cowl door assembly is opened, the inlet to the engine remains closed to substantially prevent foreign object damage to the engine.

8. The plenum assembly of claim 1, wherein the inlet flange is configured to be substantially aligned with an outer surface of a door member of the cowl door assembly when the door member is closed.

9. The plenum assembly of claim 1, wherein the inlet of the engine comprises an engine inlet duct, the outlet flange is connected a side of the engine inlet duct, and the plenum duct extends outwardly from the side of the engine inlet duct.

10. An inlet system for a rotorcraft, the inlet system comprising:
   a plenum assembly comprising:
      a plenum duct having an inlet flange and an outlet flange at opposing ends of the plenum duct;
      the inlet flange defining an inlet to flow air into a bather filtration system, the inlet flange configured to be substantially aligned with an outer surface of a closed cowl door assembly of the rotorcraft, wherein a gap between the inlet flange and the closed cowl door assembly allows relative motion of the plenum assembly and the rotorcraft;
      the outlet flange defining an outlet to flow air filtered by the barrier filtration system into an engine of the rotorcraft, wherein an inlet of the engine is connected to the cowl door assembly and the outlet flange is positioned between the inlet of the engine and the engine; and
      the plenum duct configured to flow air from the inlet to the outlet of the barrier filtration system and to be hard mounted to the engine of the rotorcraft; and
   the cowl door assembly comprising:
      a door member configured to be coupled to a structure of the rotorcraft;
      a cowl inlet opening; and
      a cowl inlet duct.

11. The system of claim 10, further comprising the barrier filtration system configured to filter air flowing into the engine through the plenum duct, the barrier filtration system configured to be positioned in the plenum assembly between the cowl door assembly and the engine.

12. The system of claim 11, wherein the barrier filtration system is configured to be hard mounted to the plenum assembly.

13. The system of claim 12, wherein the plenum duct is configured to extend to an outer mold line (OML) of the rotorcraft and wherein the inlet flange is configured to be aligned with the OML.

14. The system of claim 13, wherein the inlet flange is configured to form the gap between the plenum inlet and the OML when the plenum inlet is aligned with the OML.

15. The system of claim 14, further comprising a lip seal configured to at least partially cover the gap.

16. The system of claim 13, wherein the gap is dimensioned based on a relative motion between the engine and the plenum duct.

17. The plenum assembly of claim 13, wherein when a door member of the cowl door assembly is opened, the inlet to the engine remains closed to substantially prevent foreign object damage to the engine.

18. The plenum assembly of claim 13, wherein the inlet flange is configured to be substantially aligned with an outer surface of a cowl door of the cowl door assembly when the cowl door is closed.

19. The plenum assembly of claim 13, wherein the inlet of the engine comprises an engine inlet duct, the outlet flange is connected a side of the engine inlet duct, and the plenum duct extends outwardly from the side of the engine inlet duct.

* * * * *